United States Patent [19]

Getgen

[11] 3,833,772

[45] Sept. 3, 1974

[54] TIME DIVISION RESONANT TRANSFER HYBRID CIRCUIT AND METHOD

[75] Inventor: Lawrence E. Getgen, Redwood City, Calif.

[73] Assignee: GTE Automatic Electric Laboratories Incorporated, Northlake, Ill.

[22] Filed: Apr. 9, 1973

[21] Appl. No.: 349,572

[52] U.S. Cl. ........ 179/170 NC, 179/15 AA, 333/11
[51] Int. Cl. ........ H04b 1/58
[58] Field of Search.... 179/15 AA, 170 NC; 333/11

[56] References Cited

UNITED STATES PATENTS

| | | | |
|---|---|---|---|
| 3,267,218 | 8/1966 | Adelaar | 179/15 AA |
| 3,745,256 | 7/1973 | Carbrey | 179/15 AA |

FOREIGN PATENTS OR APPLICATIONS

| | | | |
|---|---|---|---|
| 1,258,905 | 1/1968 | Germany | 179/15 AA |

*Primary Examiner*—David L. Stewart
*Attorney, Agent, or Firm*—Leonard R. Cool; Russell A. Cannon; T. C. Jay, Jr.

[57] ABSTRACT

A time division hybrid circuit for communications systems which functions by means of a plurality of resonant transfer energy storage devices connected to the line, transmitting and receiving terminals of the system and a plurality of gates for periodically connecting the devices in a manner achieving the desired hybrid function. More specifically, the line connected device is periodically connected to the transmitting terminal connected device at a sampling frequency of at least two times the highest message frequency of interest (Nyquist theorem) to establish periodic conducting periods effecting resonant transfer of energy from the line device to the transmitting device; and the receiving terminal connected device is connected to the line connected device at the same sampling frequency for establishing second conducting periods effecting resonant transfer of energy with each of the second conducting periods closely following each first named conducting period and within the sampling interval.

11 Claims, 4 Drawing Figures

TIME DIVISION RESONANT TRANSFER HYBRID CIRCUIT AND METHOD

BACKGROUND OF THE INVENTION

1. Field of the Invention

The invention relates generally to hybrid circuitry for communication systems. More specifically, the invention relates to circuitry for converting between a two-wire, two-directional circuit and a pair of two-wire, one-directional circuits.

In communication systems messages are commonly transmitted over a pair of wires which serve both directions of signal flow. In many applications, however, it is necessary to convert from the double directional transmission line to a circuit which handles each direction of signal flow separately. One such example is in the case where it becomes necessary to provide amplification between the communicating entities at the ends of the transmission line. Amplifiers, being inherently unidirectional in nature, can function only in a circuit in which the directions of signal flow have been segregated.

Hybrid circuits are used to separate and isolate each of the transmission paths. These circuits conventionally operate on the principle of magnetic field balancing or cancellation. In practice, each end of an opened two-wire line is connected to a multi-winding transformer and a balancing network which in principle should match the characteristics of the connecting two-wire circuit. The transformers serve to interconnect the pair of circuits servicing the signals being transmitted in opposite directions with the two-wire transmission line servicing both directions of signal transmission. The circuit is designed such that with a condition of perfect balance no interaction occurs between the pair of two-wire circuits servicing signals in opposite directions. For a general discussion of hybrid circuits, see "Principles of Electricity Applied to Telephone and Telegraph Work," American Telephone and Telegraph Company Long Lines Department, June, 1961.

These conventional hybrids have, however, a number of disadvantages. At least one-half of the transmitted power is always lost either in the balancing network for the receive-to-line direction of transmission or in the receive line termination for the line-to-transmit direction of transmission. Practically, the transition loss is on the order of 4.5 dB. Furthermore, the transhybrid loss — that is, the loss between the pair of two-wire circuits servicing signals being transmitted in opposite directions — of a conventional hybrid depends upon the hybrid balance. This in turn depends upon the matching of the hybrid balance network to the line termination and upon the perfection of magnetic coupling in the transformers. Moreover, a relatively costly balancing network is required. Additionally, the bandwidth over which the conventional hybrid can maintain a balance is limited.

2. Description of the Prior Art

Earlier attempts at achieving the hybrid function using time division switching and resonant transfer have been made. See "Time Division Hybrids for Telephone Transmission," by H. S. Feder, Bell Telephone Laboratories, First IEEE Communications Conference, Boulder, Colo., June, 1965. There proposed is a time division hybrid using a time displacement of 62.5 microseconds between the closure of the two switches or gates used to effect the resonant transfer of energy within a 125 microsecond sampling interval. Thus, although each gate samples or closes once every 125 microseconds, there is a gate closure twice as often or once every 62.5 microseconds. Because of this gating sequencing of the Feder hybrid, the hybrid must be constructed in such a fashion that half the power is wasted in either direction of signal transmission as is the case with a conventional hybrid. Furthermore, the filters utilized in the transmission and reception of energy in hybrids operating with this gating sequencing must of necessity be limited to the type which have current impulse response zeros at the sampling interval and multiples thereof. This restriction on design flexibility and the above described power loss are undesirable results of the Feder hybrid.

SUMMARY OF THE INVENTION

I have discovered, however, that the hybrid function can be achieved using time division switching and resonant transfer techniques but having energy transmitting and receiving filters designed according to any scheme which merely requires the filters to be compatible among themselves when operating in a resonant transfer mode. A key to this discovery lies in a novel gating sequence, i.e., closing and opening the two gates involved very close to one another in time within the sampling interval. Furthermore, not only does this sequencing yield flexibility in terms of the design of the energy transmitting and receiving devices, but it virtually eliminates the undesirable power losses as well.

Accordingly, it is an object of the present invention to provide a hybrid circuit of the character described which avoids the foregoing disadvantages of prior art hybrid circuits; and specifically, to provide a hybrid circuit having nearly perfect power transfer characteristics while not requiring balancing networks or specifically limited types of resonant transfer devices.

A further object of the present invention is to provide a hybrid circuit which can accept a very broad input bandwidth.

Yet another object of the present invention is to provide a hybrid circuit which is inexpensive to manufacture and install in communication systems, very reliable in operation, simply and efficiently accomplishes the hybrid function, and is readily adaptable and conformable to a variety of circuit configurations and applications.

The invention possesses other objects and features of advantage, some of which will be set forth in the following description of the preferred forms of the invention which are illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

Referring to said drawings.

DETAILED DESCRIPTION

Figure 1:
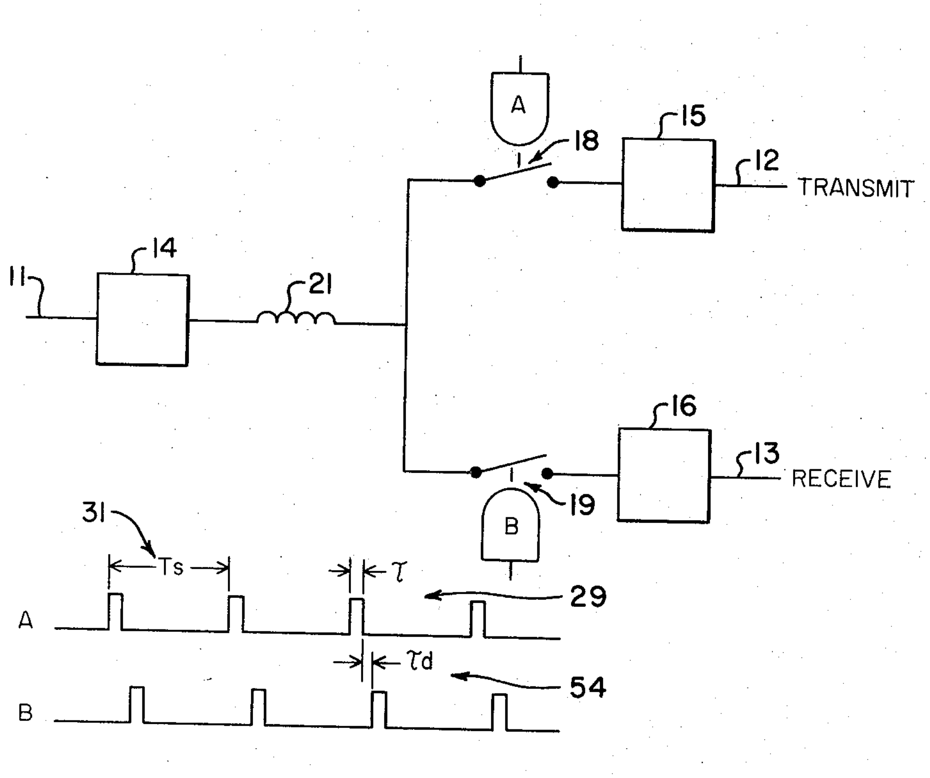
FIG. 1 is a diagrammatic representation of the hybrid circuit in accordance with the present invention together with a time display of the gating sequence as used therein.

The hybrid circuit and method is adapted for use in communication systems having line, transmitting and receiving terminals 11, 12, and 13, respectively; energy storing devices 14, 15, and 16 constructed for energy transfer in a resonant transfer mode and being connected to terminals 11–13; gates 18 and 19 connecting device 14 to devices 15 and 16, respectively; and means for operating gates 18 and 19 at a sampling frequency of at least two times the highest message frequency of interest so as to establish periodic conducting periods effecting resonant transfer of energy from device 14 to device 15, and sequentially periodically connecting device 16 with device 14 for establishing second conducting periods effecting resonant transfer of energy from device 16 to device 14 with each second conducting period closely following each first named conducting period and within the sampling interval.

The resonant transfer circuit here used is of the well-known series type including series connected capacitors and inductor. Conveniently, the capacitors will be included in devices 14, 15, and 16 and in the present configuration, FIG. 1, a single inductor 21 may be connected between device 14 and gates 18 and 19 so as to serve in the series resonant circuit between devices 14 and 15, and between devices 16 and 14. Preferably, device 14 comprises a filter as illustrated in FIG. 2 having a pair of capacitors 17 and 22 and an inductor 20, with capacitor 22 functioning as one of the series resonant capacitors. In most carrier systems, a filter is likewise included in both the transmit and receive channel units. Conveniently, these latter filters can serve as energy storing devices 15 and 16 as seen in FIG. 2. With reference to this figure, it will be noted that filter 15 includes capacitors 23 and 25 and inductor 30, with capacitor 23 serving as the series resonant capacitor. Filter 16 here includes capacitors 24 and 35 and inductor 40, with capacitor 24 serving as the resonant series capacitor. Where the customary carrier system filters 15 and 16 are adapted for present purposes, the cost of the present hybrid circuit is limited to the cost of filter 14, inductor 21, gates 18 and 19, and the driving means therefor which results in a low-cost yet highly efficient hybrid structure.

Figure 2:
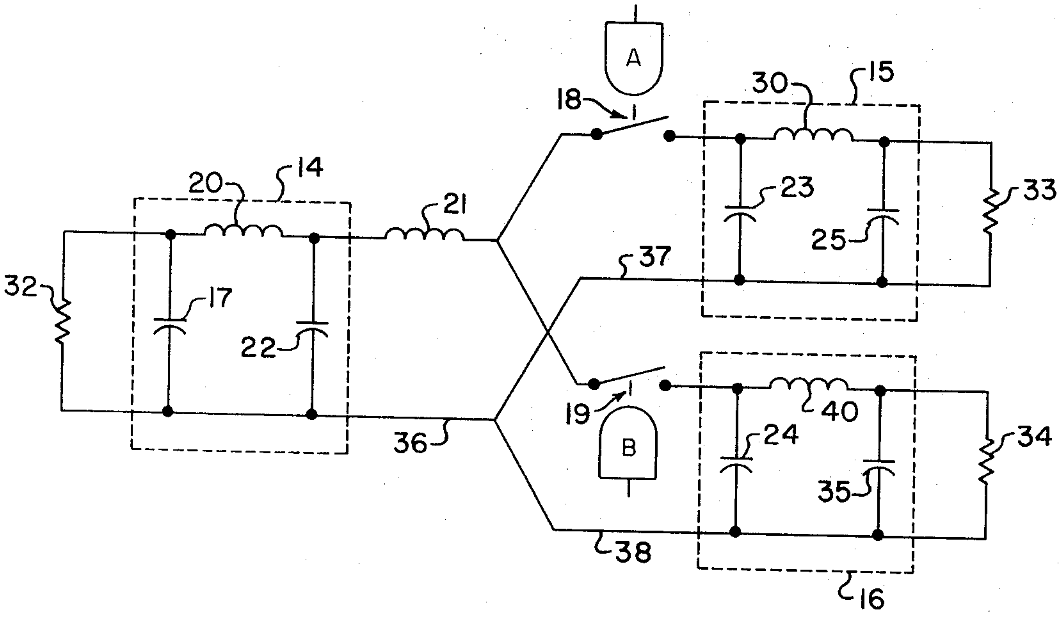
FIG. 2 is a circuit diagram of a preferred embodiment of the present invention.

The series resonant circuits are designed such that their half period at resonance is equal to the gate closure time $\tau$ (indicated at 29 in FIG. 1). This insures that the energy stored in one of the capacitors, e.g., capacitor 22 of FIG. 2, will be transferred through inductor 21 to the capacitor on the other side of the gate, e.g., capacitor 23 of FIG. 2. Because each of the circuits is designed for resonance, this transfer of energy is nearly perfect, occurs during a very short interval $\tau$ (on the order of one microsecond), and results in substantially all of the stored energy residing in the capacitor on one side of the gate being transferred to the capacitor on the other side of the gate, i.e., resonant transfer. It is important to the resonant transfer of energy herein described that gates 18 and 19 be analog, i.e., that they have a resistance in the closed state which is not dependent on the signal level being passed; preferably this resistance is low. For normal voice communication systems having the highest message frequency of interest at about 4 kHz, a sampling frequency of 8 kHz will satisfy the Nyquist criterion thus providing a relatively long interval $T_s$ of approximately 125 microseconds as compared to the very short interval for resonant energy transfer. Accordingly, the conducting period provided by closure of gate 18 together with the conducting period provided by closure of gate 19 following as closely as possible without significant overlap after the opening of gate 18 may easily be accomplished within the sampling interval with much room to spare, thus enabling a very much higher bandwidth transmission where desired. It may be noted in this regard that the input baseband bandwidth that the present circuit can accept is limited only by the speed of the switching devices or gates 18 and 19. With presently available gates a 250 kHz input bandwidth would be possible, which far exceeds the capability of a conventional hybrid.

The manner in which the present invention achieves the hybrid function is as follows. Message intelligence incoming to line terminal 11 and to be transmitted through to transmit terminal 12 is initially stored in energy storage device 14. Gate 18 is closed briefly, as above described, and the energy stored in device 14 is resonantly transferred to energy storage device 15. There can be no communication between line terminal 11 and receive terminal 13 during this time because gate 19 remains open. Energy storage device 15 may then process the received intelligence in a variety of ways and transmit the stored energy through terminal 12 so as to be charge free at the time gate 18 again closes.

Resonant transfer assures that instantly after gate 18 opens the entire energy stored in device 14 has been transferred to device 15, putting device 14 in a readied state to receive energy from device 16. As closely as possible without significant overlap following the opening of gate 18 then, gate 19 is closed and the energy stored in device 16 (due to the incoming intelligence through receive terminal 13) will be resonantly transferred through inductor 21 to device 14, from there to be processed on through line terminal 11. Ideally, gate 19 should be closed instantaneously after gate 18 opens. However, due to imperfect gate closing and opening characteristics (gate skewing) this is not feasible. Therefore, as will be more fully explained below, there is a short time delay between the opening of gate 18 and the closing of gate 19 — on the order of 0.5 to 2 microseconds. This gating sequence is important in eliminating the power losses of prior art hybrid circuitry, and additionally, in allowing the utilization of energy storage devices 14, 15, and 16, which are compatible for operation in a resonant transfer mode. Specifically, where the energy storage devices 14, 15, and 16 are filters, the latter are not required to have as a design criterion current impulse response zeros at multiples of the sampling frequency, but rather only need be compatible for operation in a resonant transfer mode and in this connection to be able to absorb the energy transferred to them within the sampling period $T_s$.

It will be noted as a characteristic of the present circuitry that it is possible to transmit a signal from a transmit line through storage device 14 back to the receive line. This may occur as follows. Closing a gate 18 will resonantly transfer signal from a device 15 to a device 14. Before device 14 can absorb the energy so received, gate 19 will close thus transmitting the energy from device 14 into device 16. This energy transfer will be accompanied by essentially zero loss. On the other hand, the reverse cycle of operation, i.e., transfer of energy from a device 16 to device 14 to device 15 will not occur due to the time delay following closure of a gate 19 before closing of gate 18, and during such time delay the dissipation of energy by device 14 is complete.

Normally the use of the circuitry is in the configuration shown, that is terminal 12 as a transmit terminal and 13 as a receive terminal of the hybrid circuit. In such case and to prevent the energy transfer from device 15 to device 16 as above described, unidirectional means such as amplifiers are normally included in the transmit and receive lines. In this fashion, the sequencing of gates 18 and 19 together with the resonant circuitry described above insures that information being transmitted from line terminal 11 passes only through transmit terminal 12 while information to be received at line terminal 11 must originate from receive terminal 13, the circuitry further insuring that transmit terminal 12 and receive terminal 13 are never interconnected. Finally, it should be noted that devices 14 and 15 have sufficient time to process the energy received prior to the next transmission.

The above described periodic closing and opening of the gates 18 and 19 will result in the continuous message intelligence being chopped or sampled during brief gate closure times $\tau$. However, a familiar communications systems sampling theorem (sometimes called the Nyquist criterion) is that if a message which is a magnitude-time function is sampled instantaneously at regular intervals and at a rate at least twice the highest significant message frequency, the samples will contain all of the information of the original message. See "Transmission Systems for Communications," Bell Telephone Laboratories Incorporated, prepared for publication by Western Electric Company, Incorporated, Technical Publications, Winston-Salem, N.C., revised fourth edition, December, 1971, page 116 et seq. The "highest significant message frequency" or "highest frequency of interest" is, of course, defined in terms of the baseband to which the message intelligence has been limited — usually by a lowpass filter. Since usually this baseband will have a gradual attenuation roll-off at its upper end, it is customary to speak of the highest significant message frequency as the frequency at which the baseband attenuation characteristic reaches its 3 dB level. Such terminology will be used hereinafter, and a lowpass filter "cut-off" frequency will likewise indicate its 3 dB attenuation point.

As a feature of the present invention, the basic form of the hybrid circuitry hereinabove described requires no balancing networks in accomplishing the hybrid function and additionally, due to resonant transfer and the gating sequencing utilized, has nearly perfect power transfer characteristics, thus avoiding undesirable power losses. The theoretical loss through the hybrid of the present invention in either direction is 0 dB as compared to 3 dB for a conventional hybrid. The actual measured loss is approximately 1.5 dB as compared to approximately 3.5 dB for a conventional hybrid and 4.0 dB for the Feder time division hybrid, referenced above.

As previously explained, the series resonant circuits providing the resonant transfer action in the embodiment of FIG. 2 comprise capacitors 22 and 23 together with inductor 21 in the transmit branch of the circuit and capacitors 22 and 24 together with inductor 21 in the receive branch of the circuit. In practice, it has been found convenient to choose capacitors 22, 23, and to 5o have the same capacitance. In that case the gate closure time $\tau$ is related to the circuit elements by the equation $$\tau = \pi / \sqrt{2/LC}$$

where L is the inductanc of inductor 21 in henries, C is the value of one of capacitors 22, 23, or 24 in farads, and $\tau$ is the gate closure time 29 in seconds.

In the case where filters are to be used for the energy storing devices 14, 16, and 17, they need only be designed so as to be compatible with each other when operating in a resonant transfer mode. The circuit design can be accomplished in a variety of ways. The object of the design is to obtain a nearly lossless and distortionless transmission among the filters during the small sampling interval $\tau$ which is related to the circuit elements as described above. A common method of designing lowpass filters to be used in resonant transfer systems is to design each filter with a cut-off frequency (3 dB attenuation level) at substantially equal to one-half the sampling frequency and to provide current impulse response zeros at multiples of the sampling frequency, see "Data Transmission" by Bennett and Davy, McGraw-Hill 1965, page 53 et seq. As a feature of the present invention this design criterion is not required, thus making the present hybrid circuit highly flexible in terms of constituent circuit elements. For general reference to the design of resonant transfer filters see:

Biorci, G. (ed.). Network and Switching Theory. Fettweiss, A. (Chapt. 4) Theory of Resonant Transfer Circuits. New York, Academic Press, 1968, p. 634.

Gibbs, A. Design of a Resonant Transfer Filter. Institute of Electronic and Electrical Engineers, Transactions on Circuit Theory CT-13: 392–398, December 1966.

May P. and T. Stump. Synthesis of a Resonant Transfer Filter as Applied to a Time Division Multiplex System. American Institute of Electrical Engineers Transactions, Part I, Communication and Electronics, 79:615–620, November 1960.

Thomas, G. Synthesis of Input and Output Networks for a Resonant Transfer Gate. 1961 Institute of Radio Engineers International Convention Record, 4:236–243, 1961.

Any combination of lowpass or bandpass filters can be used so long as they are compatible among themselves when operating in a resonant transfer mode, i.e., the achieving of a nearly lossless and distortionless transmission through gates 18 or 19 during their closure time $\tau$. Additionally, of course, capacitors 22, 23, and 24 within the filters and inductor 21 must be chosen to provide the series resonant circuits which correspond to the gate closure times $\tau$ as described above. Finally, the number of circuit elements used in the filters will vary depending upon the quality of the filter desired.

Preferably in voice frequency communication systems filter 14 is a lowpass filter having its cut-off or 3 dB attenuation level not exceeding one-half of the sampling frequency so as to comply with the sampling theorem set forth above and to prevent distortion produced by sampling at an insufficient sampling frequency. The filter cut-off frequency will, as mentioned above, determine the highest message frequency of interest to be transmitted throughout the system.

Resistive terminations 32, 33, and 34 are shown in FIG. 2 as characteristic terminations and which may actually be a source of message information in the case of resistor 32 or a line impedance balancing transformer, an amplifier, or a transmission line in the case of resistors 33 and/or 34. FIG. 2 illustrates an unbalanced hybrid configuration, that is, each of the branches of the circuit is not symmetrical with respect to common lines 36, 37, and 38. In such an arrangement no switching of the common line 36, 37, 38 is required. Where a balanced configuration is used, additional gates may be required.

Figure 3:
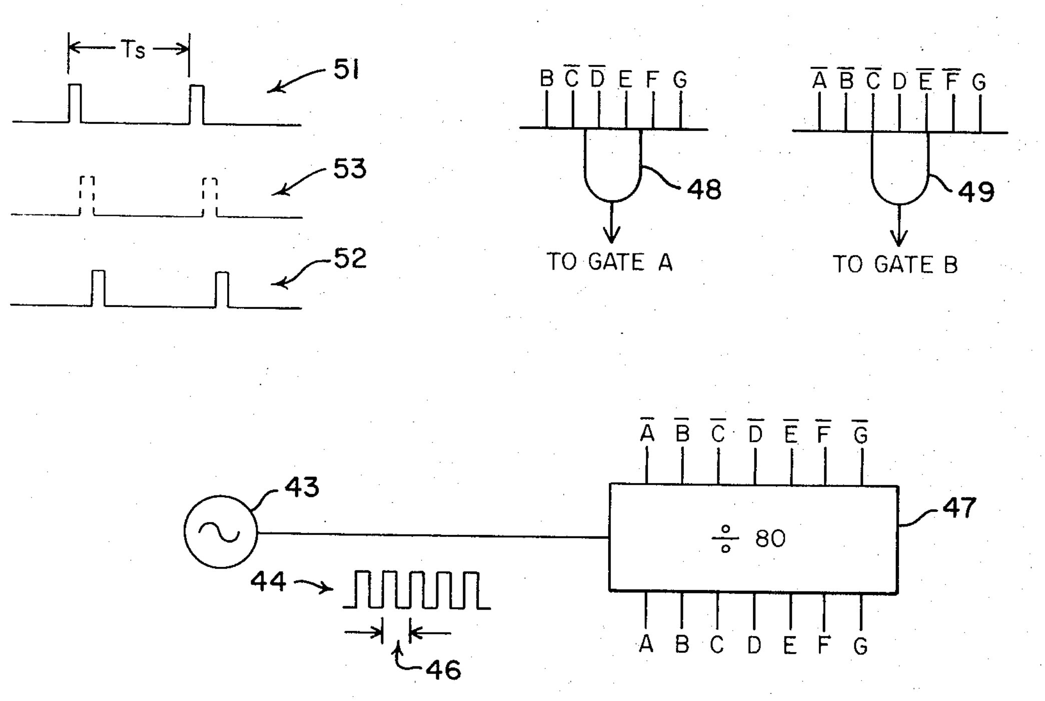
FIG. 3 is a diagrammatic representation of the gate sequencing source and a time display of the outputs of portions of the sequencing circuitry.

The driving means for gates 18 and 19 is shown in FIG. 3. This means comprises a circuit which will (1) close and open each of gates 18 and 19 at a sampling frequency equal to at least two times the highest significant message frequency to be transmitted by the system, (2) close each gate for a time period $\tau$ (related to the series resonant circuit elements by the equation set forth above) sufficient to effect the resonant transfer of energy above described, and (3) close gate 19 closely following the opening of gate 18 such that the hybrid operation can be achieved. The circuit here shown comprises an oscillator 43 having an output pulse train at 640 kHz, thus producing a spacing 46 between adjacent pulses of 1.56 microseconds.

Oscillator 43 is connected to frequency division counter 47 which in this case is a divide-by-80 counter with a plurality of outputs $\overline{A}$ to $\overline{G}$ and their complements A to G. These outputs are connected to word detector gates 48 and 49 which are in turn connected to the transmit and receive analog gates 18 and 19, respectively. The output of word detector gate 48 is indicated at 51 in FIG. 3, while the output of gate 49 is indicated at 52. When the frequency of oscillator 43 is divided by 80, the interval $T_s$ (indicated on pulse train 51) is 125 microseconds, corresponding to a sampling frequency of 8 kHz and therefore a highest significant message frequency of approximately 4 kHz.

Word detector gates 48 and 49 are connected to and provide the triggering pulses for the sequencing of gates 18 and 19. Note that the output 52 of word detector gate 49 closely follows in time the output 51 of word detector gate 48 as required. Indicated at 53 is the series of pulses occurring periodically between outputs 51 and 52. The circuitry is such that pulse series 53 is not read out, thus leaving a time interval of approximately 1.56 microseconds between each output pulse of detector gate 48 and each output pulse of detector gate 49. This in turn produces the short time lag $\tau_d$ shown at 54 in FIG. 1 between the opening of gate 18 and the closing of gate 19 to accommodate the operations of gates 18 and 19. For further information on circuits of the type shown in FIG. 3, see "Digital Communications with Space Applications," Prentice-Hall, Inc., 1964, Appendix 3 page 173 et seq.

Figure 4:
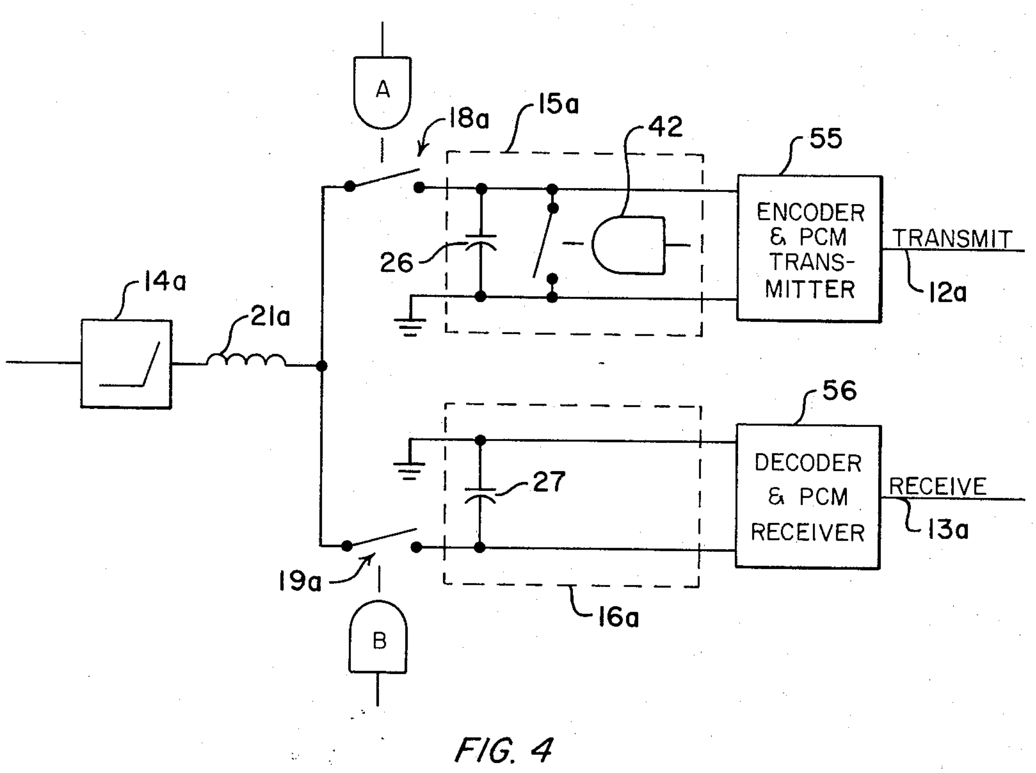
FIG. 4 is a circuit diagram of an alternative embodiment of the hybrid circuitry in accordance with the present invention.

A modified form of the invention is illustrated in FIG. 4 wherein the hybrid circuit is used in a pulse code modulation (PCM) system. In this embodiment energy storage device 14*a* comprises a lowpass filter which once again includes a capacitor which forms part of a series resonant circuit with inductor 21*a* and capacitor 26, or with inductor 21*a* and capacitor 27. Gates 18*a* and 19a are sequenced as above described. In the transmit branch, the circuit energy storage device 15*a* comprises capacitor 26 which is connected to an encoder and PCM transmitter 55 which is in turn connected to transmit terminal 12*a*. In the operation of the transmit branch, energy stored in filter 14*a* is resonantly transferred through gate 18*a* onto capacitor 26. Encoding of the signal level on capacitor 26 is effected by unit 55 and transmitted over the transmit path. Following such encoding and transmission, the charge on capacitor 26 is discharged by closing of gate 42 connected across the capacitor as seen in FIG. 4, thus preparing capacitor 26 to receive the next energy sample from filter 14*a*. This operation is periodically repeated upon each closure of gate 18*a*. In the receive branch, a decoder and PCM receiver 56 are connected to receive terminal 13*a* and to an energy storage capacitor 27. Coded messages incoming to receive terminal 13*a* are decoded and "dumped" onto capacitor 27 (here providing energy storage device 16*a*) awaiting periodic closure and resonant transfer to filter 14*a* by closure of gate 19*a* connected between capacitor 27 and inductor 21*a*.

Gate 42 must be closed at the same periodicity as gates 18*a* and 19*a;* and this can be accomplished by driving gate 42 from the circuit generally shown in FIG. 3. Another word detector gate (not shown) similar to gates 48 and 49 may be connected to frequency division counter 47 for selecting a pulse falling between pulses 51 selected by word detector gate 48, providing sufficient time for operation of the encoder and transmitter while at the same time ensuring the discharge of capacitor 26 prior to the next oncoming resonant pulse.

What is claimed is:

1. A time division hybrid circuit for communication systems having line and transmitting and receiving terminals comprising:

first, second, and third energy storing devices constructed for energy transfer in a resonant transfer mode and being connected to said terminals, respectively;

a first analog gate connecting said first and second devices;

a second analog gate connecting said first and third devices; and means for closing and opening said first and second gates in sequence with said gates closing for a period effecting said energy transfer and providing for the closing of said second gate as closely following as possible without significant overlap after the opening of said first gate, said means effecting said closing and opening at a sampling frequency equal to at least two times the highest significant message frequency to be transmitted by the system.

2. A circuit as defined in claim 1:

said first device comprising a filter.

3. A circuit as defined in claim 2:

said devices comprising:

capacitors; and inductor connecting said capacitors and functioning therewith to provide resonant circuits.

4. A circuit as defined in claim 3:

said inductor connecting the capacitor of said first device and said gates.

5. A circuit as defined in claim 4:
an oscillator;
a frequency division counter connected to said oscillator; and
word detector gates connected to said counter and said first named gates.

6. A circuit as defined in claim 3:
said filter being a lowpass filter having a cut-off frequency not exceeding one-half of said sampling frequency.

7. A circuit as defined in claim 6:
said second and third devices comprising filters compatible with said first named filter for operation in a resonant transfer mode.

8. A circuit as defined in claim 7:
said second and third devices comprising lowpass filters each having a cut-off frequency substantially equal to the cut-off frequency of said first named filter.

9. A circuit as defined in claim 6:
said second and third devices comprising bandpass filters compatible with said first-named filter for operation in a resonant transfer mode, and said bandpass filters having bandwidths equal to the bandwidth of said first-named filter.

10. A circuit as defined in claim 1:
said second device comprising a capacitor and a discharge gate connected across said capacitor;
an encoder and pulse code modulated transmitter connected to said capacitor and to said transmitting terminal;

means periodically closing said discharge gate following encoding of the signal on said capacitor;
said third device comprising a capacitor; and
a decoder and pulse code modulated receiver connected to said last named capacitor and to said receiving terminal.

11. A method of obtaining a hybrid function in a communications system having line and transmitting and receiving terminals comprising:
selecting first, second, and third energy storing devices constructed for energy transfer in a resonant transfer mode and connecting said devices to said terminals, respectively;
periodically connecting said first device to said second device at a sampling frequency of at least two times the highest message frequency of interest to establish periodic conducting periods effecting resonant transfer of energy from said first to said second device; and
sequentially periodically connecting said third device to said first device at said sampling frequency for establishing second conducting periods effecting resonant transfer of energy from said third to said first device and with each said second conducting period occurring as closely following as possible without significant overlap each first-named conducting period and within the interval provided by said sampling frequency.

* * * * *

UNITED STATES PATENT OFFICE
CERTIFICATE OF CORRECTION

Patent No. 3,833,772 Dated September 3, 1974

Inventor(s) Lawrence E. Getgen

It is certified that error appears in the above-identified patent and that said Letters Patent are hereby corrected as shown below:

Column 6, line 8, after "and", change "to 5o" to -- 24 to --.
Column 7, line 36, after "outputs" change "$\overline{A}$ to $\overline{G}$" to -- A to G --; same column, line 37, change "A to G" to -- $\overline{A}$ to $\overline{G}$ --.

Signed and sealed this 3rd day of December 1974.

(SEAL)
Attest:

McCOY M. GIBSON JR.
Attesting Officer

C. MARSHALL DANN
Commissioner of Patents

FORM PO-1050 (10-69)
USCOMM-DC 60376-P69
☆ U.S. GOVERNMENT PRINTING OFFICE : 1969 O—366-334